(12) United States Patent
Pedersoli

(10) Patent No.: US 6,430,793 B1
(45) Date of Patent: Aug. 13, 2002

(54) MACHINE FOR OPENING DIES FOR EXTRUDING ALUMINUM AND ALLOYS THEREOF

(75) Inventor: Mario Pedersoli, Concesio (IT)

(73) Assignee: Compes S.p.A., Rodengo Saiano (IT)

( * ) Notice: Subject to any disclaimer, the term of this patent is extended or adjusted under 35 U.S.C. 154(b) by 0 days.

(21) Appl. No.: 09/598,679

(22) Filed: Jun. 21, 2000

(30) Foreign Application Priority Data

Apr. 12, 2000 (IT) ......................................... MI00A0812

(51) Int. Cl.[7] ................................................ B23P 19/04
(52) U.S. Cl. ......................................... 29/239; 29/281.5
(58) Field of Search ............................. 29/239, 281.5, 29/235, 228; 83/636, 491, 51, 861; 82/58, 113

(56) References Cited

U.S. PATENT DOCUMENTS

| | | | | |
|---|---|---|---|---|
| 3,756,100 A | * | 9/1973 | Bachmann | 82/58 |
| 4,092,886 A | * | 6/1978 | Nowisch | 83/636 |
| 4,279,067 A | * | 7/1981 | Jenks | 29/239 |
| 5,235,882 A | * | 8/1993 | Rabourn | 83/636 |
| 5,916,343 A | * | 6/1999 | Huang et al. | 82/58 |

FOREIGN PATENT DOCUMENTS

| | | |
|---|---|---|
| CH | 232 408 | 5/1944 |
| DE | 197 01 021 | 7/1998 |
| FR | 945 790 | 5/1949 |

OTHER PUBLICATIONS

Patent Abstracts of Japan vol. 011, No. 327 (M–635), Oct. 24, 1987 –& JP 62 110812 A (SENYO KK), May 21, 1987 abstract.
Patent Abstracts of Japan vol. 018, No. 677 (M–1727), Dec. 20, 1994 –& JP 06 269892 A (SUMITOMO METAL IND LTD), Sep. 27, 1994 abstracts.
Patent Abstracts of Japan vol. 012, No. 179 (M–701), May 26, 1988 –& JP 62 289322 A (TAKATORI SEISAKUSHO: KK; OTHERS: 01), Dec. 16, 1987 abstracts.

* cited by examiner

Primary Examiner—Joseph J. Hail, III
Assistant Examiner—Lee Wilson
(74) Attorney, Agent, or Firm—Guido Modiano; Albert Josif; Daniel O'Byrne

(57) ABSTRACT

A machine for opening dies for extruding aluminum and alloys thereof, comprising a table for supporting a die to be opened which is connected to translatory motion elements for placing the die at a parting unit which has a plurality of tools distributed around the die and provided with a parting blade which can be gradually moved closer and inserted between the two parts that constitute the die.

8 Claims, 4 Drawing Sheets

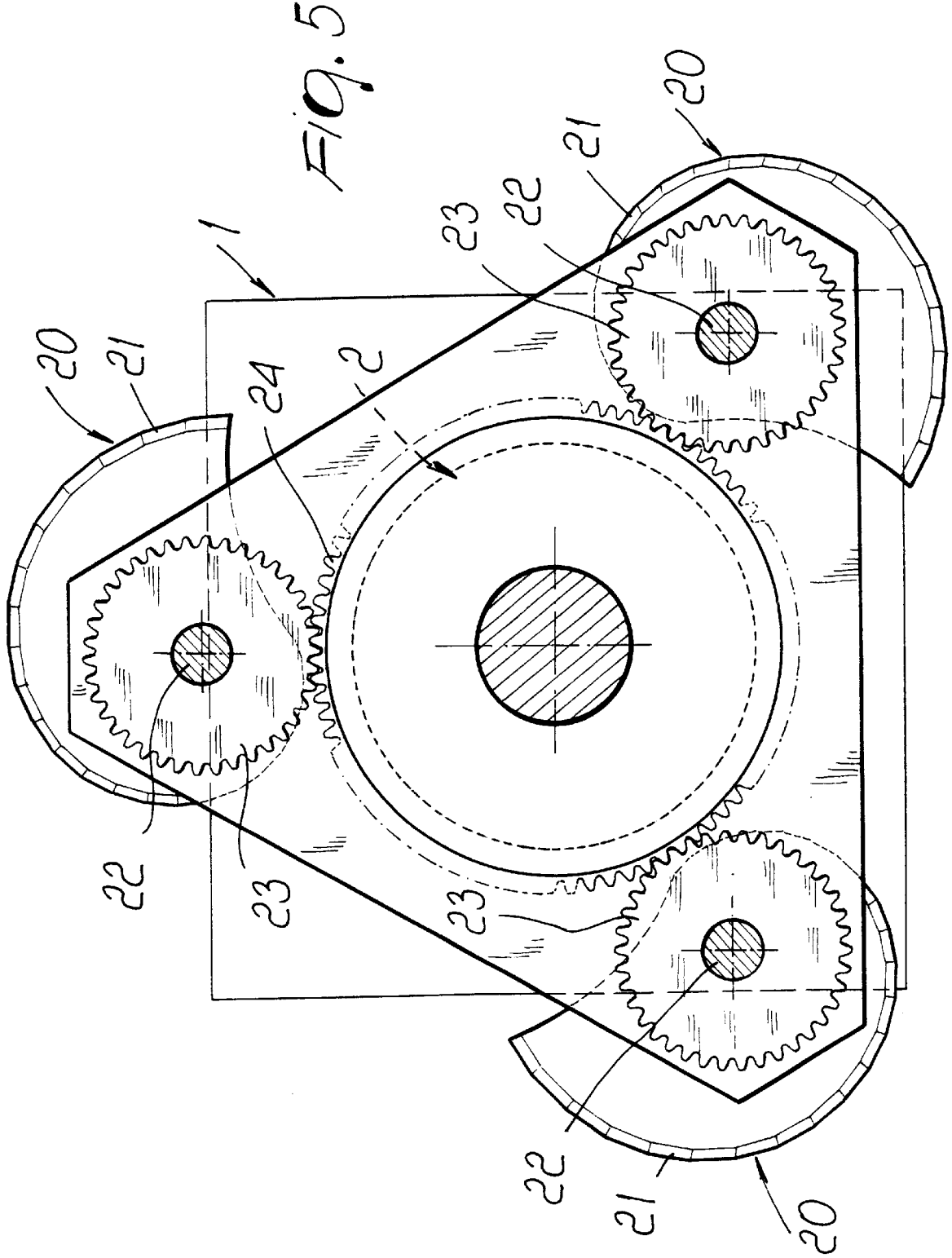

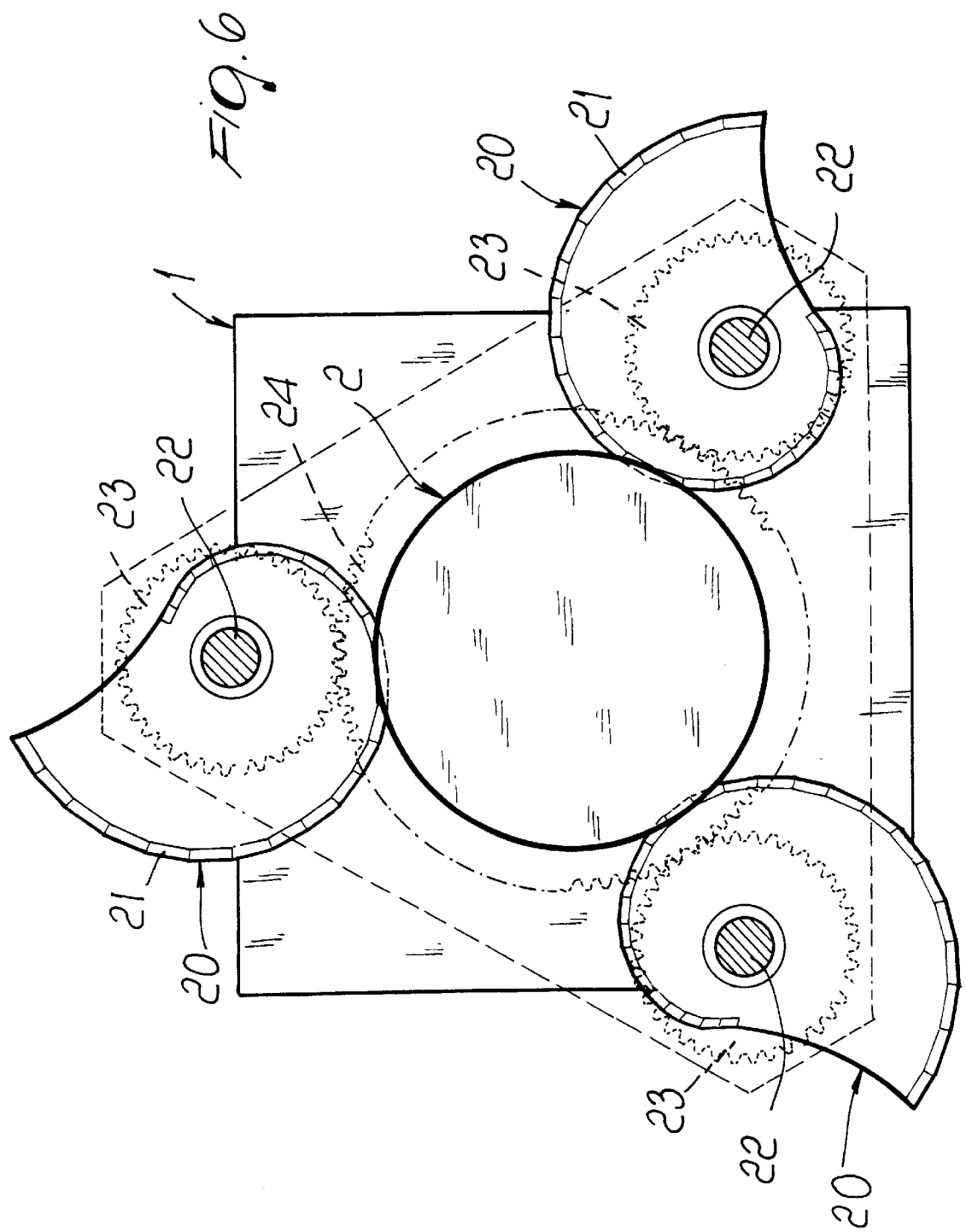

MACHINE FOR OPENING DIES FOR EXTRUDING ALUMINUM AND ALLOYS THEREOF

BACKGROUND OF THE INVENTION

The present invention relates to a machine for opening dies for extruding aluminum and alloys thereof.

It is known that dies for extruding aluminum and alloys thereof are constituted by two parts which are mutually coupled so as to form the profile of the parts being formed and are mutually separated by a parting line or recess arranged on the outer surface.

In order to open the two parts of the die, at present a tool, constituted for example by a chisel, is inserted at the recess, is applied to a point of the outer surface of the die and is gradually inserted, for example with a hammer, in order to separate the two parts.

This method produces an asymmetrical opening force which can lead to jamming and can arrange the two parts to be opened at an angle to each is other, consequently damaging the extruded part.

Another inherent problem of the above technology is constituted by the fact that it is necessary to apply an intense physical effort, with the risk of accidents among operators.

SUMMARY OF THE INVENTION

The aim of the present invention is to solve the above-described problem, by providing a machine for opening dies for extruding aluminum and alloys thereof which allows to perform opening automatically, with a parting force which is exactly adjustable and uniform on the perimeter of the die, accordingly eliminating the possibility of mutual tilting of the two parts that constitute the die.

Within the scope of this aim, an object of the present invention is to provide a machine which allows to drastically reduce the time required to separate the die parts, at the same time drastically reducing the resulting noise.

Another object of the present invention is to provide a machine which, in addition to reducing the physical work of workers, allows to extend the useful life of the dies, which are in no way damaged during the parting step.

Another object of the present invention is to provide a machine for opening dies for extruding aluminum and alloys thereof which, owing to its particular constructive characteristics, is capable of giving the greatest assurances of reliability and safety in use and is further competitive from a purely economical point of view.

This aim, these objects and others which will become better apparent hereinafter are achieved by a machine for opening dies for extruding aluminum and alloys thereof, according to the invention, characterized in that it comprises a table for supporting a die to be opened which is connected to translatory motion means for placing the die at a parting unit which has a plurality of tools distributed around said die and provided with a parting blade which can be gradually moved closer and inserted between two parts that constitute the die.

BRIEF DESCRIPTION OF THE DRAWINGS

Further characteristics and advantages of the present invention will become better apparent from the following detailed description of a preferred but not exclusive embodiment of a machine for opening dies for extruding aluminum and alloys thereof, illustrated only by way of non-limitative example in the accompanying drawings, wherein:

FIG. 5 is a schematic plan view of the parting unit, with the tools spaced from the die;

FIG. 6 is a view of the parting unit, with the tools inserted between the two parts of the die.

DESCRIPTION OF THE PREFERRED EMBODIMENTS

Figure 1:
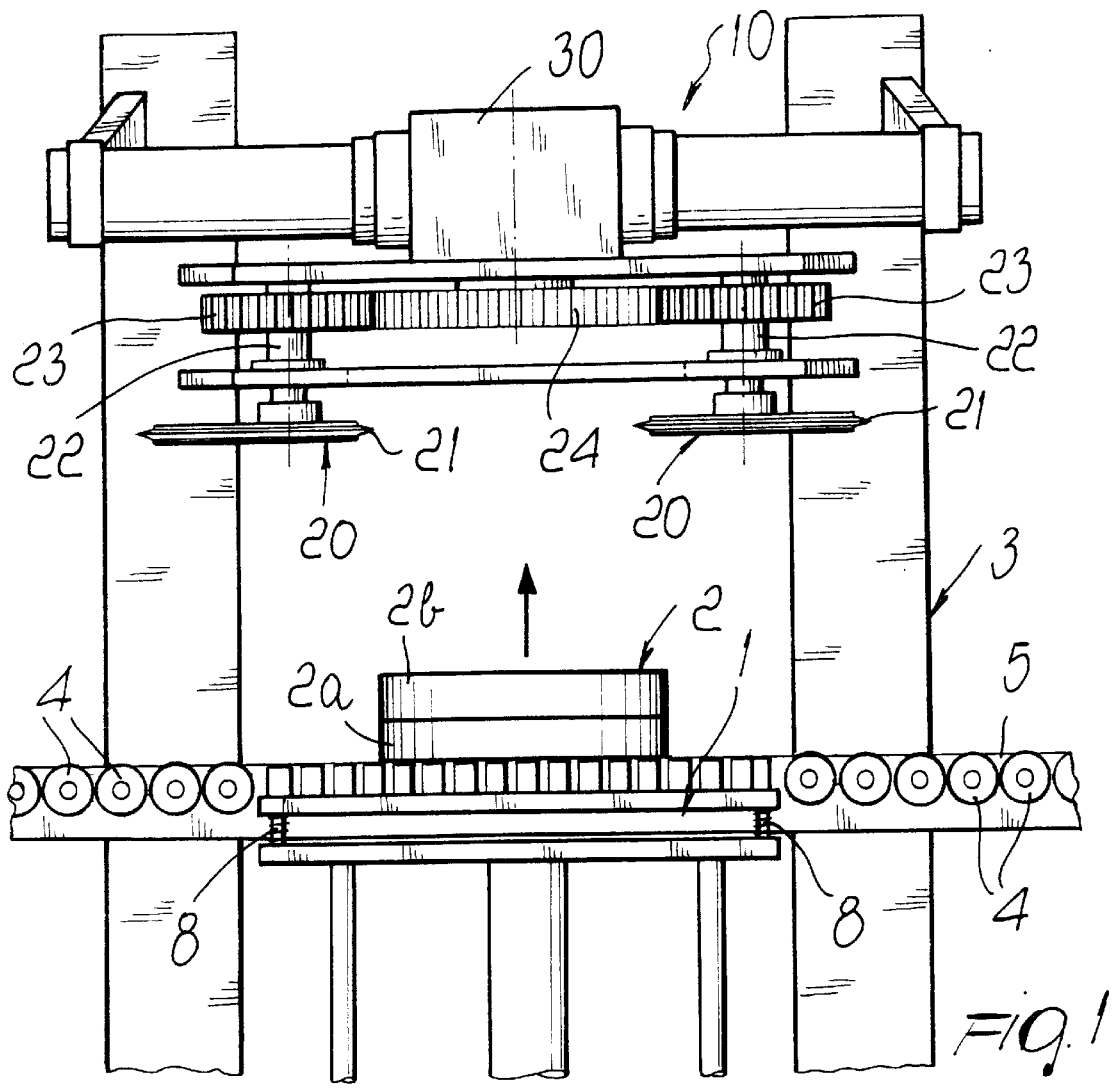
FIG. 1 is a schematic view of the machine according to the invention, with the die to be opened arranged on the supporting table.
Figure 2:
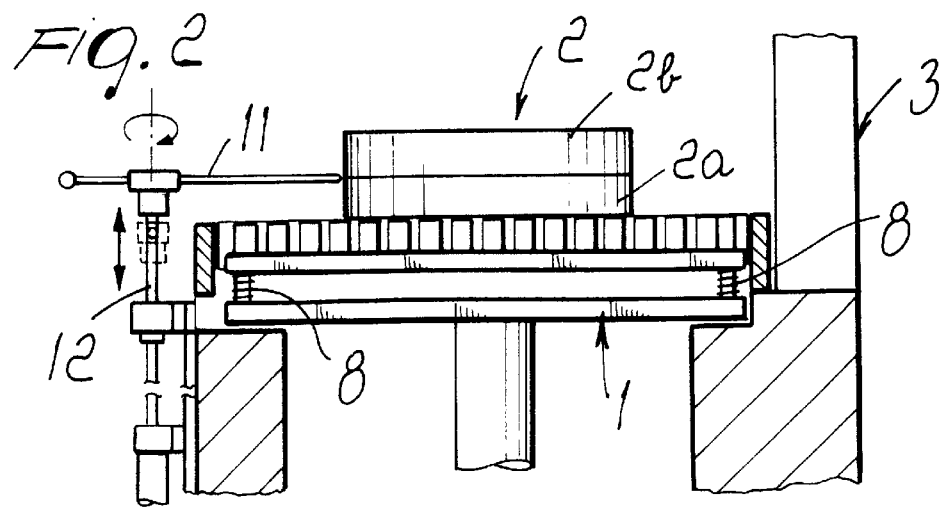
FIG. 2 is a schematic view of the means for detecting the center of the die.
Figure 3:
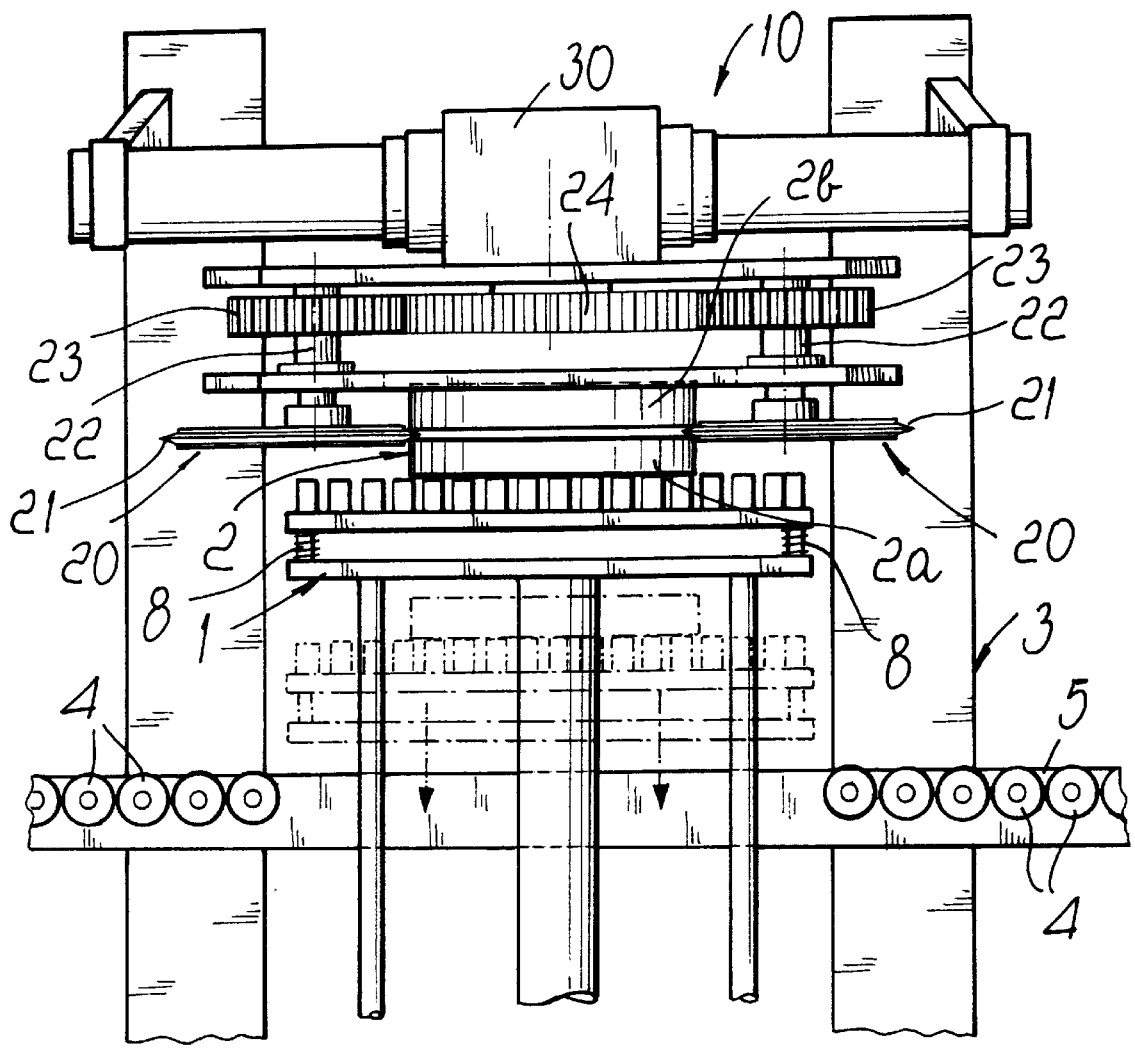
FIG. 3 is a view of the step for arranging the die in the parting unit.
Figure 4:
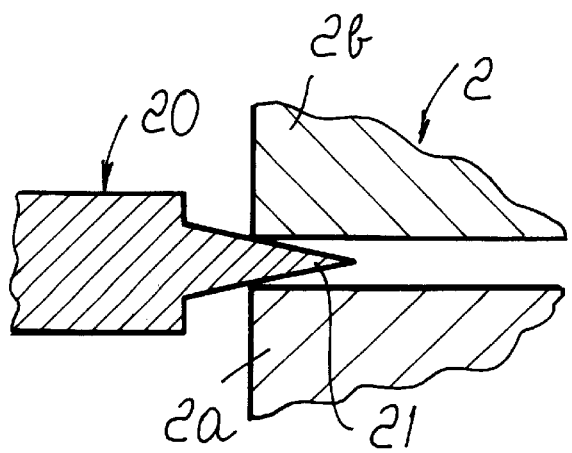
FIG. 4 is an enlarged-scale view of the detail of the insertion of the parting blade between the two parts of the die.

With reference to the above figures, the machine for opening dies for extruding aluminum and alloys thereof, according to the invention, comprises a supporting table 1 for the die 2 to be opened.

The supporting table is arranged within a frame 3 of the machine which has an input roller conveyor 4 and an output roller conveyor 5, both of which are arranged at the level of the supporting table in the initial conditions.

The supporting table 1 is connected to translatory motion means, constituted for example by a pneumatic cylinder or other equivalent means, which are meant to place the die 2 at a parting unit, which is generally designated by the reference numeral 10 and is supported by the frame 3.

At the supporting table 1 there are means for detecting the center of the die which are constituted by an alignment probe 11 supported by a rod 12 which is connected to measurement means which allow to precisely detect the center of the die, so as to process a unit of information which takes into account the extent of the translatory motion of the supporting table, so as to correctly arrange the die 2 in the parting unit 10.

The supporting table 1 is provided with a plurality of pins which form the plane of arrangement, which is connected to the translatory motion platform 7 by interposing elastic compensation means 8.

The parting unit 10 is constituted by a plurality of tools and more specifically by a minimum number of three tools 20 which are arranged at 120° to each other; in the case of a larger number of tools, the mutual angle of course varies; the tools 20 have a flat spiral shape, with a parting blade 21 which is formed by straight portions arranged side by side so as to assume a flat spiral shape.

Each tool 20 is supported by an auxiliary shaft 22 which is rotatably connected to the frame 3 and on which a driven gear 23 is keyed; the gear meshes with a central driving gear 24 which simultaneously turns all three tools.

The central gear 24 is actuated by means of a rack cylinder 30 which is actuated by the hydraulic controller.

In practical operation, the operator arranges the die 2 substantially at the center of the supporting table 1 and then detects the position of the center of the die; after this, once the protective housing of the apparatus has been closed, the supporting table performs a translatory motion, moving the die into position between the tools.

The rotation of the tools 20, which are circumferentially and uniformly distributed around the die 2, first of all causes perfect centering of the die with respect to the tools; then the subsequent rotation of the tools 20 causes the parting blades 21, due to the spiral shape of the tools 20, to gradually and uniformly penetrate between the two parts 2a, 2b of the die 2, causing their separation and keeping them strictly parallel to each other.

The rotation step ends by means of a sensor which detects the pressure value in the rack cylinder 30, halting its operation when a preset value is reached.

Once parting has been performed, the supporting table 1 is lowered with the lower part 2a of the die 2, which can thus be moved away, while the upper part 2b is retained between the parting blades 21.

Once the lower part 2a of the die has been unloaded, the supporting table 1 is lifted again in order to take the upper part 2b, which is released by means of the rotation of the tools 20 in the opposite direction; such tools 20 accordingly move away from the upper part 2b of the die, which is thus released and can be moved away after the descent of the supporting table 1.

From the above description it is thus evident that the invention achieves the intended aim and objects, and in particular the fact is stressed that an automatic machine is provided in which it is possible to apply a parting force in points which are uniformly distributed along the circumference on the die, which is therefore not subjected to transverse deformation stresses which might arrange the two parts that constitute the die at an angle to each other.

Moreover, the particular spiral shape of the blades of the tools allows to achieve gradual insertion by way of the simple rotation of each tool about a respective fixed axis.

The invention thus conceived is susceptible of numerous modifications and variations, all of which are within the scope of the inventive concept.

All the details may furthermore be replaced with other technically equivalent elements.

In practice, the materials used, as well as the contingent shapes and dimensions, may be any according to requirements.

The disclosures in Italian Patent Application No. MI2000A000812 from which this application claims priority are incorporated herein by reference.

What is claimed is:

1. A machine for opening dies for exuding aluminum and alloys thereof, comprising a table for supporting a die to be opened which is connected to translatory motion means for placing the die at a parting unit which has a plurality of tools distributed around said die, said tools being provided with a parting blade which can be gradually moved closer and inserted between parts that constitute the die, and further comprising means for detecting a center of the die which are adapted to drive said translatory motion means.

2. The machine according to claim 1, wherein said means for detecting the center of the die comprise an alignment probe which is supported by a rod which is connected to measurement means which process a unit of information for controlling said translatory motion means.

3. The machine according to claim 1, wherein said supporting table has a purality of pins which form a plane of arrangement, said supporting table being supported by a translatory motion platform by way of interposed elastic compensation means.

4. The machine according to claim 1, wherein said plurality of tools is uniformly distributed in a circumferential region around said die.

5. The machine according to claim 1, wherein said tools have a flat spiral configuration and are rotatably fitted about an axis which is substantially perpendicular to the plane of arrangement of said spiral.

6. The machine according to claim 1, wherein said tools have a parting blade which is formed by straight portions arranged side by side so as to assume the shape of a flat spiral.

7. The machine according to claim 1, wherein each one of said tools is supported by an auxiliary shaft which is rotatably connected to a frame of the machine and to which a driven gear is keyed, said driven gear meshing with a central driving gear in order to turn said tools simultaneously.

8. The machine according to claim 7, further comprising a rack cylinder for the actuation of said central driving gear.

* * * * *